(12) United States Patent
Williams

(10) Patent No.: US 7,318,479 B2
(45) Date of Patent: Jan. 15, 2008

(54) ASSEMBLY FOR CONNECTING A JUMPER TO A SUBSEA STRUCTURE

(75) Inventor: Alfred Moore Williams, Cypress, TX (US)

(73) Assignee: Dril-Quip, Inc., Houston, TX (US)

( * ) Notice: Subject to any disclaimer, the term of this patent is extended or adjusted under 35 U.S.C. 154(b) by 113 days.

(21) Appl. No.: 10/947,805

(22) Filed: Sep. 23, 2004

(65) Prior Publication Data

US 2005/0070150 A1 Mar. 31, 2005

Related U.S. Application Data

(60) Provisional application No. 60/505,318, filed on Sep. 23, 2003.

(51) Int. Cl.
*E21B 29/12* (2006.01)
(52) U.S. Cl. .................... 166/341; 166/339; 166/242.2
(58) Field of Classification Search ........ 166/341–344, 166/346, 351, 338, 339, 242.2
See application file for complete search history.

(56) References Cited

U.S. PATENT DOCUMENTS

| | | | | |
|---|---|---|---|---|
| 1,588,198 A | * | 6/1926 | Seguine | 166/83.1 |
| 3,220,477 A | | 11/1965 | Jones | 166/46 |
| 3,732,923 A | | 5/1973 | Fowler | 166/0.6 |
| 4,174,011 A | * | 11/1979 | Zaremba | 175/7 |
| 4,490,073 A | * | 12/1984 | Lawson | 405/169 |
| 4,610,570 A | * | 9/1986 | Brockway | 405/224 |
| 5,114,117 A | | 5/1992 | Appleford et al. | 251/149.9 |
| 5,249,891 A | * | 10/1993 | Pecue, II | 405/191 |
| 6,142,233 A | * | 11/2000 | Wilkins | 166/339 |
| 6,227,301 B1 | | 5/2001 | Edwards et al. | 166/344 |
| 6,644,410 B1 | * | 11/2003 | Lindsey-Curran et al. | 166/360 |
| 6,793,019 B2 | | 9/2004 | Rodgers et al. | 166/344 |
| 6,907,932 B2 | * | 6/2005 | Reimert | 166/341 |
| 2003/0145997 A1 | | 8/2003 | Langford et al. | 166/350 |

FOREIGN PATENT DOCUMENTS

GB 2 319 052 5/1998
WO WO 01/73254 10/2001

* cited by examiner

*Primary Examiner*—Thomas A Beach
(74) *Attorney, Agent, or Firm*—Paul R. Morico; Baker Botts L.L.P.

(57) ABSTRACT

An assembly for connecting a jumper to a subsea structure. The assembly comprises a jumper connector attached to an end of the jumper that has a vertically disposed main body adapted for receiving a plurality of lines, which connect into a corresponding plurality of vertically oriented female couplers disposed within the main body. The connector assembly further comprises a mating socket attached to the subsea structure that has a substantially cylindrically shaped main housing formed with a longitudinal slot and a corresponding plurality of vertically oriented male couplers. A remotely operated vehicle (ROV) vertically aligns the jumper connector with the mating socket and connects the plurality of female couplers to the corresponding plurality of male couplers.

30 Claims, 8 Drawing Sheets

ASSEMBLY FOR CONNECTING A JUMPER TO A SUBSEA STRUCTURE

RELATED APPLICATION

This application claims the benefit of U.S. Provisional patent application Ser. No. 60/505,318, filed Sep. 23, 2003, which is herein incorporated by reference in its entirely as if set forth below.

FIELD OF THE INVENTION

The present invention relates generally to subsea well systems, and, more particularly, to connector assemblies for subsea jumpers.

BACKGROUND OF THE INVENTION

Jumpers are used in subsea applications to connect the production outlet of a Christmas tree to another subsea component, such as a manifold, that may be some distance away, such as from about 50 yards to about several miles. At least a portion of the jumper is buoyant and sufficiently flexible to cause the jumper to assume a vertical arcuate configuration when installed. One end of the jumper has a connector that can be guided by a remotely operated vehicle (ROV) into a mating socket located at the wellhead or manifold, as the case may be.

Conventional jumpers typically employ horizontal connections, i.e., the connectors and mating sockets are designed to mate horizontally. A drawback of this design is that pull-in loads can cause undue bending stresses on the subsea structure and possible disconnection of the jumper connections. Disconnection can also occur from the effects of gravity acting on the mass of the jumper connector.

At least one device manufactured by Unitech has sought to solve this problem by locking the jumper connector in place with a pair of vertical locking poles. A drawback of this design is that it requires a very precise alignment of the connector with the mating socket for the connection to be made. If the remotely operated vehicle (ROV) is unable to align precisely the connector with the mating socket, the connector can get hung up on the vertical locking poles, which can damage the equipment and may prevent the connection from being made.

SUMMARY

The present invention is directed to an assembly for connecting subsea jumpers to subsea structures that overcomes or at least minimizes some of the drawbacks of prior art jumper connector assemblies.

The connector assembly according to the present invention comprises a jumper connector attached to an end of the jumper that has a vertically disposed main body adapted for receiving a plurality of lines. The plurality of lines connect into a corresponding plurality of female couplers, which are oriented vertically and disposed in a horizontal plane at a bottom surface of the main body. The connector assembly according to the present invention further comprises a mating socket attached to the subsea structure that has a substantially cylindrically-shaped main housing formed with a longitudinal slot, a base plate connected thereto and a corresponding plurality of male couplers. The male couplers are oriented vertically and disposed in a horizontal plane at a bottom surface of the main body of the mating socket. The connector assembly further comprises a vertical aligner connector adapted to align the jumper connector with the mating socket and connect the plurality of female couplers to the corresponding plurality of male couplers.

BRIEF DESCRIPTION OF THE DRAWINGS

A complete understanding of the present disclosure and advantages thereof may be acquired by referring to the following description taken in conjunction with the accompanying drawings, in which the leftmost significant digit(s) in the reference numerals denote(s) the first figure in which the respective reference numerals appear, wherein.

Figure 1:
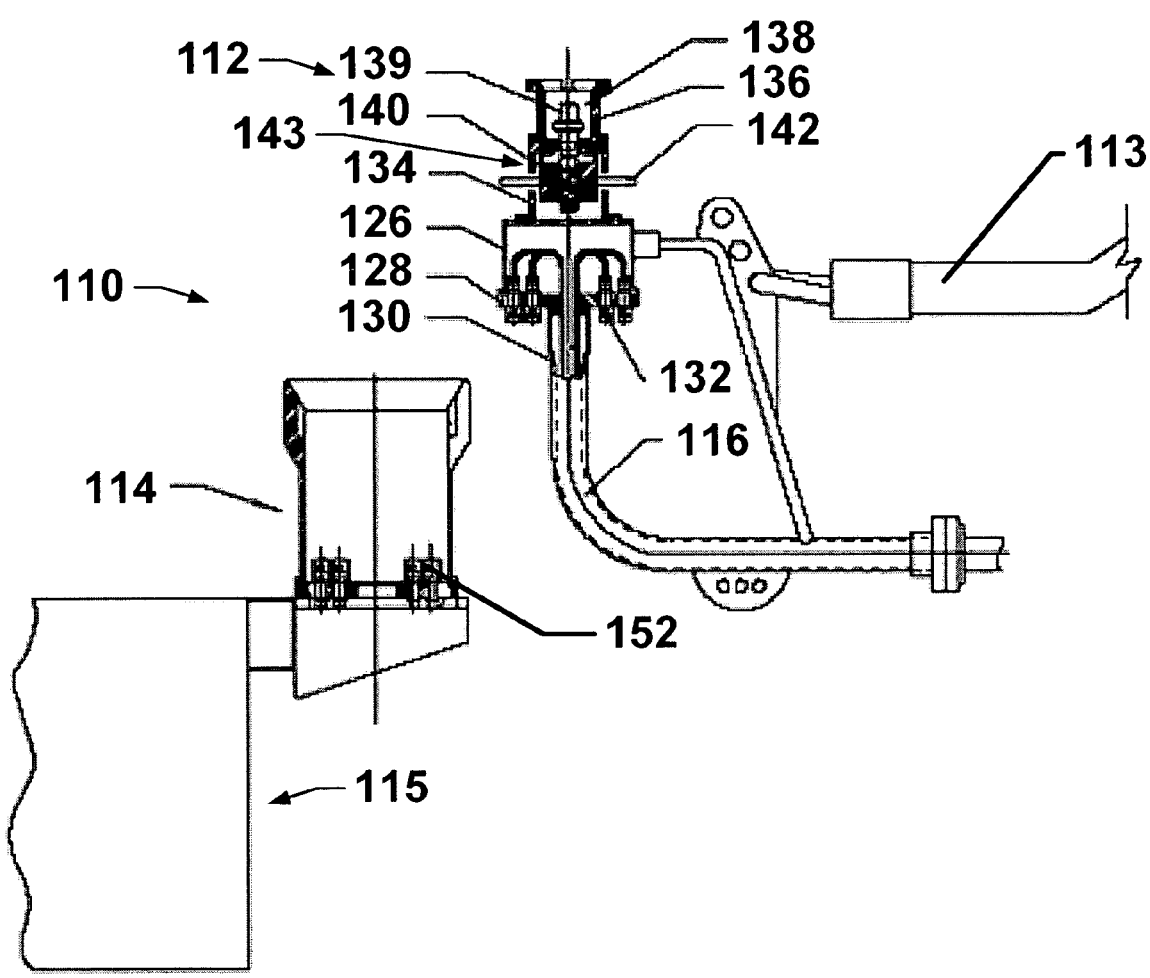
FIG. 1 schematically illustrates a subsea jumper connector and a corresponding mating socket in accordance with various exemplary embodiments of the present invention just prior to vertical alignment and engagement.

While the present invention is susceptible to various modifications and alternative forms, specific exemplary embodiments thereof have been shown by way of example in the drawings and are herein described in detail. It should be understood, however, that the description herein of specific embodiments is not intended to limit the present invention to the particular forms disclosed, but, on the contrary, the present intention is to cover all modifications, equivalents, and/or alternatives that fall within the spirit and scope of the present invention as defined by the appended claims.

DETAILED DESCRIPTION

Illustrative embodiments of the present invention are described in detail below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 2:
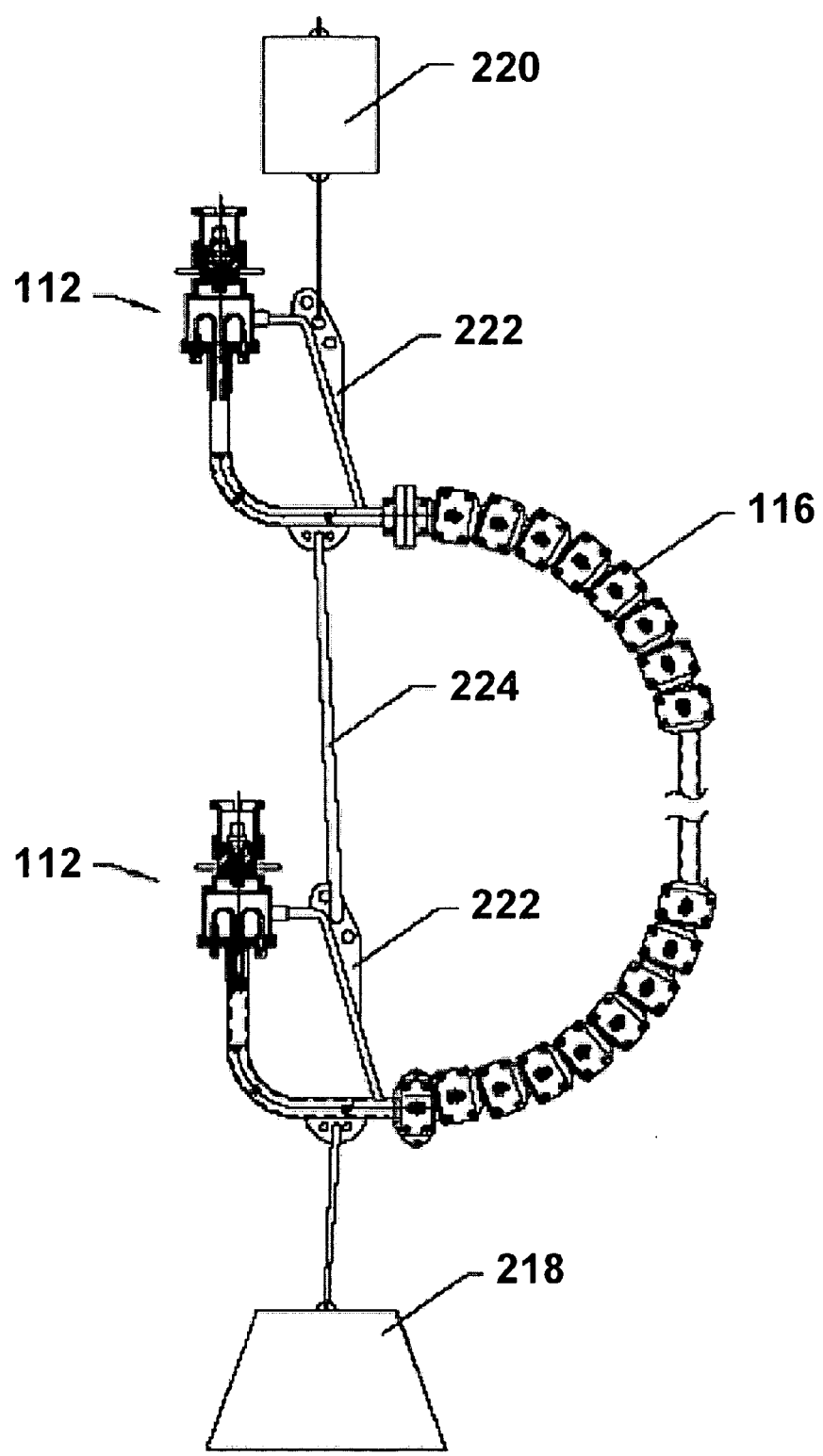
FIG. 2 schematically illustrates a subsea jumper employing a pair of connectors in accordance with various exemplary embodiments of the present invention.

The details of various illustrative embodiments of the present invention will now be described with reference to the figures. Turning to FIGS. 1 and 2, a connector assembly 110 for connecting a jumper 116 to a subsea structure 115 in accordance with various illustrative embodiments of the present invention is shown. The connector assembly 110 comprises two main components, a jumper connector 112 and a mating socket 114. The jumper connector 112 attaches to each end of jumper 116 and the mating socket 114 attaches to the subsea structure 115. The subsea structure 115 may be a manifold, a Christmas tree or any other part know to those of ordinary skill in the art having the benefit of this disclosure. The jumper 116 comprises a plurality of fluid and/or electrical conduits for connecting with mating conduits of the subsea structure 115, as by stabbing one into the other. The ends of the jumper 116 may be manipulated for this purpose by one or more remotely operated vehicles (ROVs), arms or other parts for manipulation in a subsea environment.

The ends of the jumpers 116 of this type have heretofore conventionally had parts on their ends that are moveable horizontally into and out of connection with the subsea structure 115. This has been found to be difficult due to the relative inflexibility of the bundle of conduits. The ends of the disclosed jumper 116 in various illustrative embodiments may instead be mated up with the subsea structures 115 by movement in a generally vertical direction.

The jumper 116 is landed on the ocean floor using a weight 218, as shown in FIG. 2. A buoyancy module 220 is used to keep the jumper 116 suspended above the ocean floor until an remotely operated vehicle (ROV), an arm 113 of which is shown in FIG. 1, can connect the jumper 116 ends to the various subsea structures 115. Vertical support brackets 222 keep the jumper connectors 112 disposed in a vertical orientation. A cable 224 may connect the jumper connectors 112 during landing on the ocean floor.

The jumper connector 112 has a main body 126, which is generally cylindrically-shaped and vertically disposed. The main body 126 connects to a base plate 128 on a bottom surface of the main body 126, the base plate 128 having an opening for accommodating a bundle of hydraulic fluid and/or electrical lines 130 and being generally horizontally disposed. Each of the lines 130 connects into a corresponding female coupler 132, which is vertically oriented and mounted to the base plate 128.

The jumper connector 112 further comprises main body extension 134, which attaches to a top surface of the main body 126 and a remotely operated vehicle (ROV) bucket 136, which attaches to a top surface of the main body extension 134. The main body extension 134 may be formed of a metal cylinder mounted to the top of the main body 126. The remotely operated vehicle (ROV) bucket 136 may also be formed of a metal cylinder and is adapted to receive a rotating arm (not shown) of the remotely operated vehicle (ROV).

The jumper connector 112 further includes a latchdown mechanism 138 that operates to force the plurality of female couplers 132 into engagement with the corresponding plurality of male couplers 152 formed in the mating socket 114. The latchdown mechanism 138 includes a torque screw 139 and a nut 140. The torque screw 139 mates with the nut 140 and is coupled to, but free to rotate relative to, the top of the main body extension 134. The nut 140 comprises three horizontal extension pins 142 (one of which is shown in FIG. 1), which are approximately 120 degrees apart from one another and rotate within corresponding slots 143 formed in the main body extension 134. The extension pins 142 interlock into corresponding J-slots 546 (as shown, for example, in FIG. 5) formed in the mating socket 114, as described in more detail below.

Figure 3:
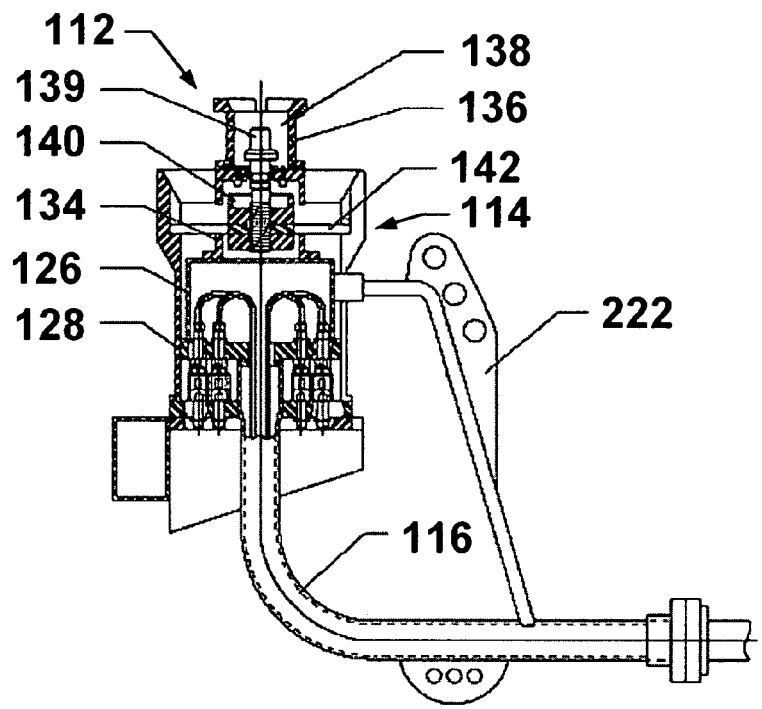
FIG. 3 schematically illustrates a vertical alignment of the subsea jumper connector and corresponding mating socket shown in FIG. 1.
Figure 5:
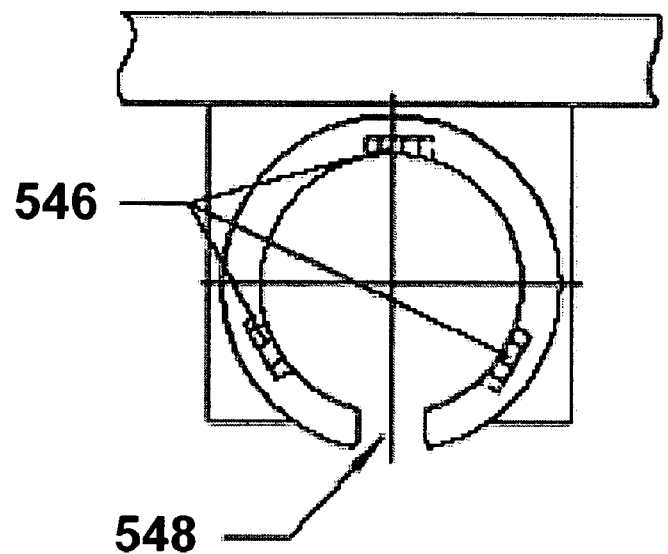
FIG. 5 schematically illustrates a top view of the main housing of the mating socket in accordance with various exemplary embodiments of the present invention.
Figure 6:
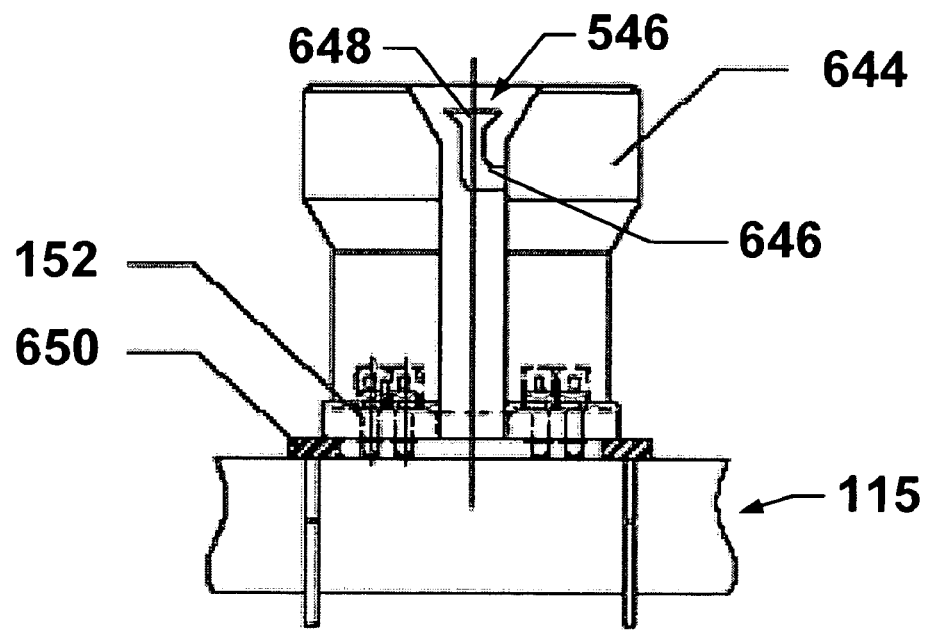
FIG. 6 schematically illustrates a side and partially cut-out view of the mating socket in accordance with various exemplary embodiments of the present invention.

The mating socket 114 is formed of a main body 644, which is generally cylindrical in shape and has a funnel contour in an upper section, as shown in FIGS. 5 and 6. The main body 644 is generally vertically disposed. The mating socket 114 has three equally spaced J-slots 546 formed in the funnel portion of the main body 644. The mating socket 114 also has a longitudinal slot 548, which enables the jumper connector 112 to be moved laterally into the main body 644 of the mating socket 114, and then lowered into the main body 644 so as to make up initially the connection between the jumper connector 112 and the mating socket 114, as shown in FIG. 3. The mating socket 114 further includes a base plate 650, which joins the main body 644 to the subsea structure 115, as shown in FIG. 6. The mating socket 114 further includes the plurality of male couplers 152, which are vertically oriented and mounted to the base plate 650.

The joining of the jumper connector 112 to the mating socket 114 by the remotely operated vehicle (ROV) will now be described. First, the remotely operated vehicle (ROV) aligns the jumper connector 112 adjacent to the mating socket 114, as shown in FIG. 1. Next, the remotely operated vehicle (ROV) aligns the jumper connector 112 directly over the mating socket 114 so that the extension pins 142 align with openings 648 in the J-slots 546. Also, in this position, the bundle 130 is received into the mating socket 114 through the longitudinal slot 548. Next, the jumper connector 112 is lowered over the mating socket 114, as shown in FIG. 3. In this position the extension pins 142 fit into the openings 648 in the J-slots 546. The remotely operated vehicle (ROV) then rotates the main body 126 of the jumper connector 112 so that the extension pins 142 move into lateral ends 646 of the J-slots 546.

Figure 4:
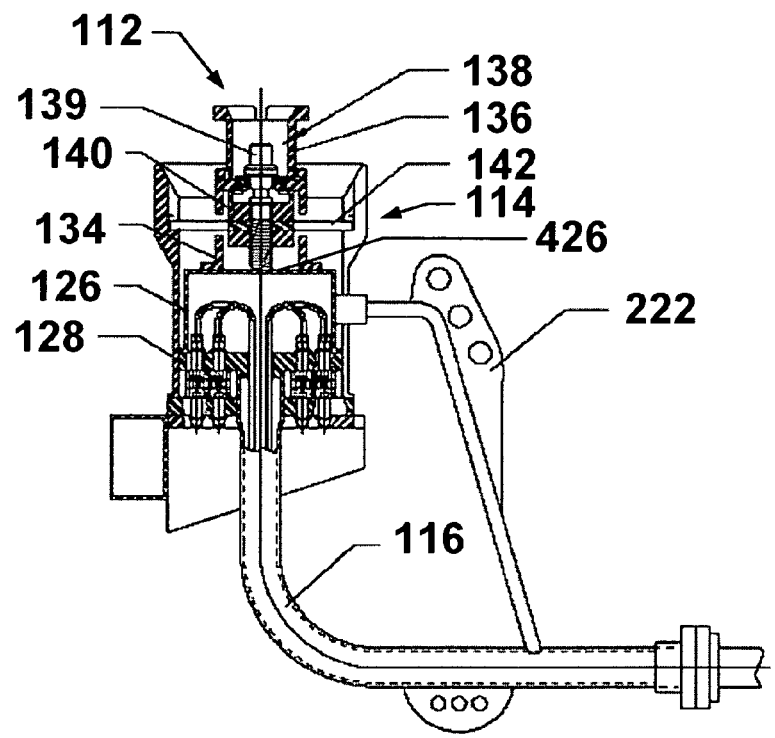
FIG. 4 schematically illustrates engagement of the subsea jumper connector with the corresponding mating socket shown in FIGS. 1 and 3.

The remotely operated vehicle (ROV) then continues to rotate the torque screw 139, which causes the nut 140 that receives the torque screw 139 to lower the torque screw 139 into engagement with a top wall 426 of the main body 126, as shown in FIG. 4. In this way, the female couplers 132 of the jumper connector 112 are lowered into a tight-fitting relation onto the male couplers 152 of the mating socket 114 to complete the connection, as shown in FIG. 4.

Figure 7:
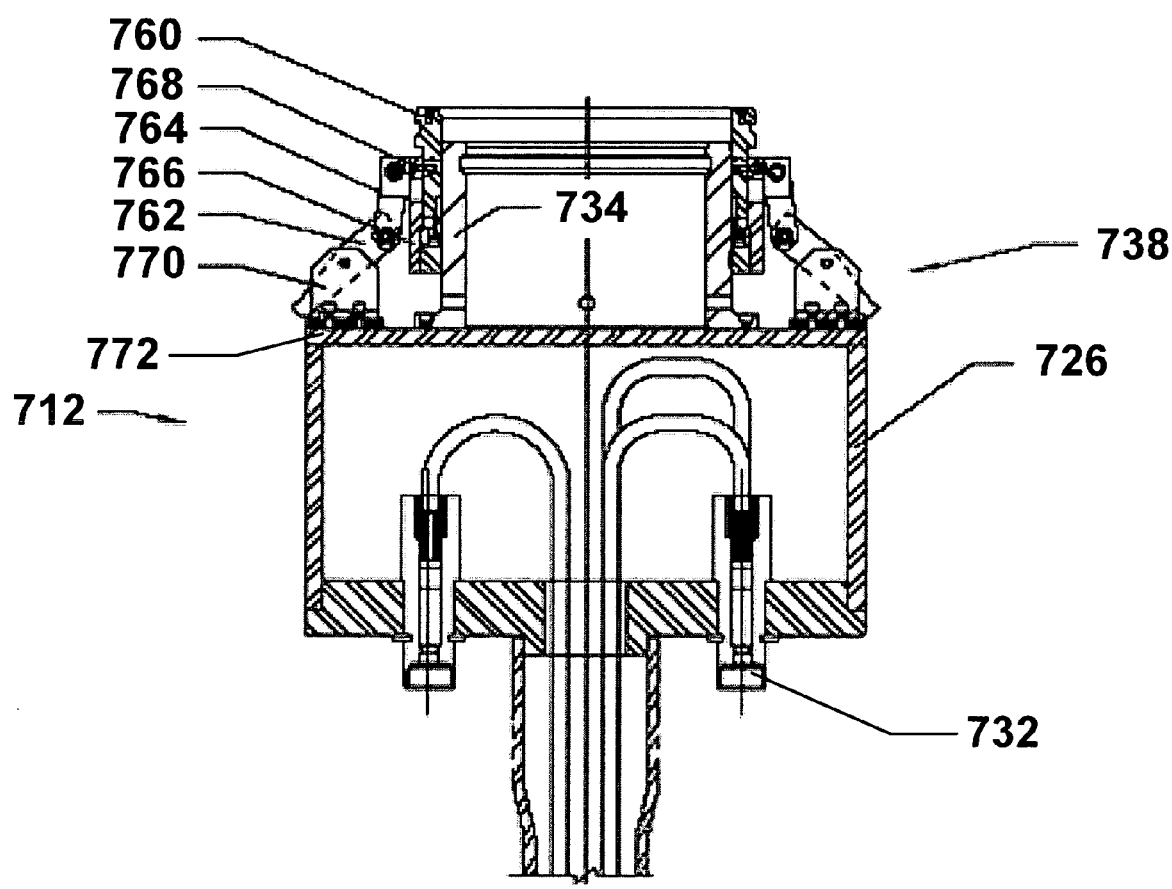
FIG. 7 schematically illustrates a subsea jumper connector incorporating a different latchdown device in accordance with various alternative exemplary embodiments of the present invention.
Figure 8:
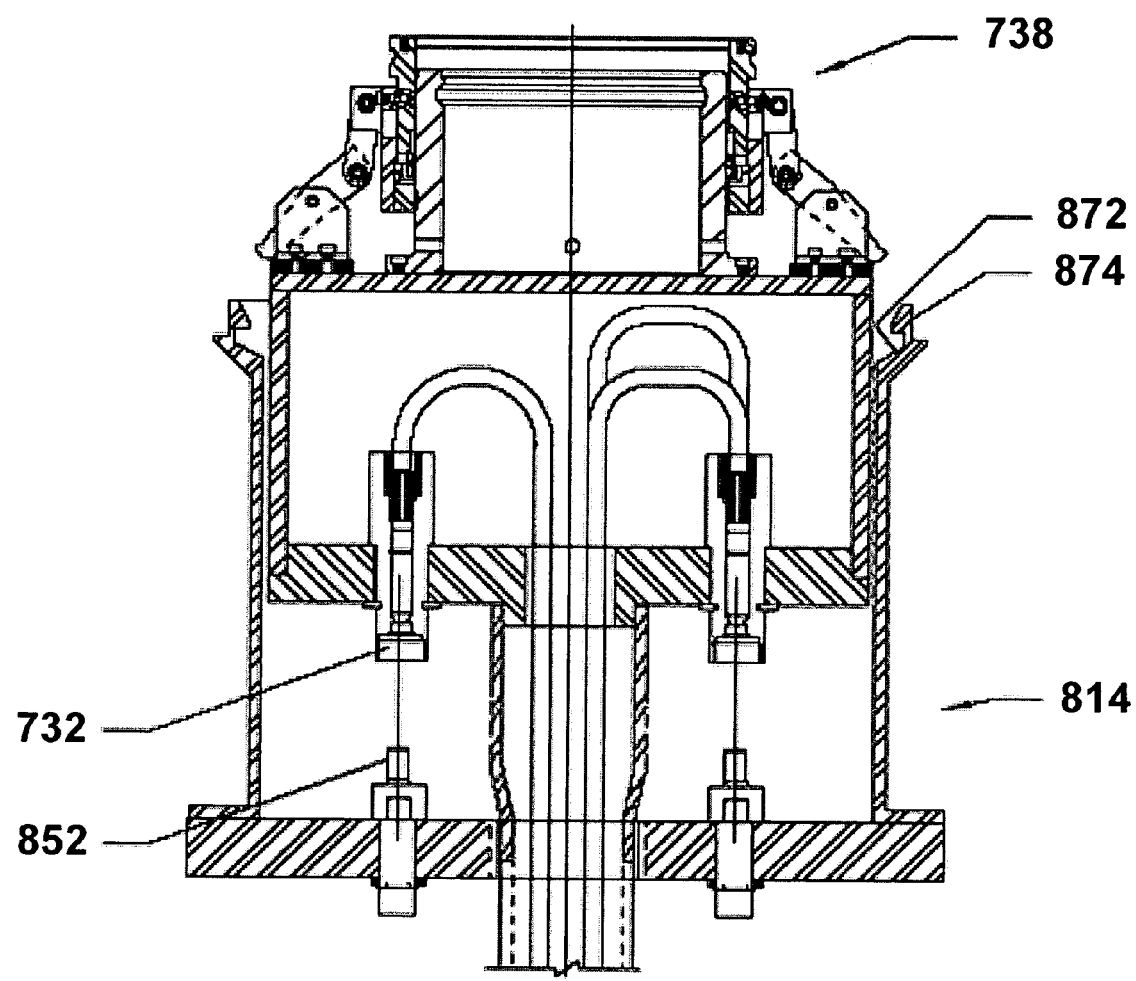
FIG. 8 schematically illustrates a vertical alignment of the subsea jumper connector and the corresponding mating socket in accordance with various alternative exemplary embodiments of the present invention shown in FIG. 7.

In various alternative illustrious embodiments of the prevent invention, a jumper connector 712 may employ a different latchdown mechanism 738, as shown in FIG. 7. The latchdown mechanism 738 comprises a latch cap 760 co-axially disposed over a main body extension 734. A plurality of latching arms 762 are attached at one end to the latch cap 760 by connecting rods 764, a thrust collar 766, and preload shear pins 768. The plurality of latching arms 762 are also attached to a corresponding plurality of brackets 770. The latching arms 762 are attached to the brackets 770 at about a mid-section of the latching arms 762, so that the latching arms 762 can pivot about such brackets 770. The brackets 770 are secured to a top surface 772 of the main body 726. In these various alternative illustrious embodiments, the mating socket 814 may be formed with a groove 872 and a corresponding locking shoulder 874, as shown in FIG. 8.

Figure 9:
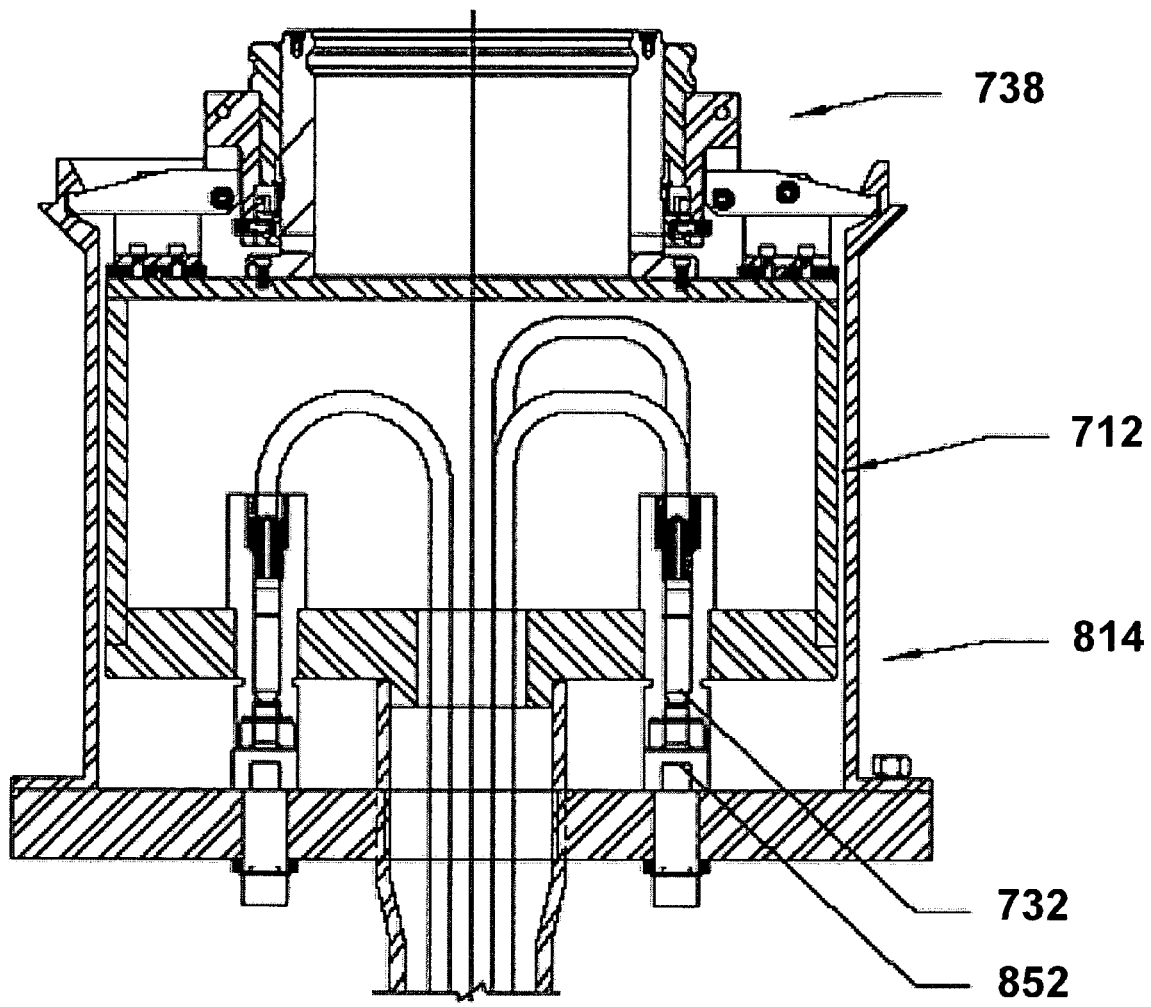
FIG. 9 schematically illustrates engagement of the subsea jumper connector with the corresponding mating socket shown in FIG. 8.

In operation, a running tool (not shown), which is coupled to the latch cap 760, is used to activate the latchdown mechanism 738. First, the running tool lowers the jumper connector 712 into the mating socket 814. Once the running tool has forced the jumper connector 712 deep into the corresponding mating socket 814, the tips of the unsecured latching arms 762 engage with the groove 872. By action of the downward force applied to the secured ends of the latching arms 762 by the connecting rods 764, which receive the downward movement through the thrust collar 766, the shear pins 768 and the latch cap 760 being forced downward by the running tool, the latching arms 762 pivot about their pivot points on the brackets 770, forcing the unsecured ends of the latching arms 762 into engagement with the shoulder 874. This, in turn, forces the female couplers 732 into engagement with the male couplers 852 and locks the jumper connector 712 within the mating socket 814, as shown in FIG. 9.

Figure 10:
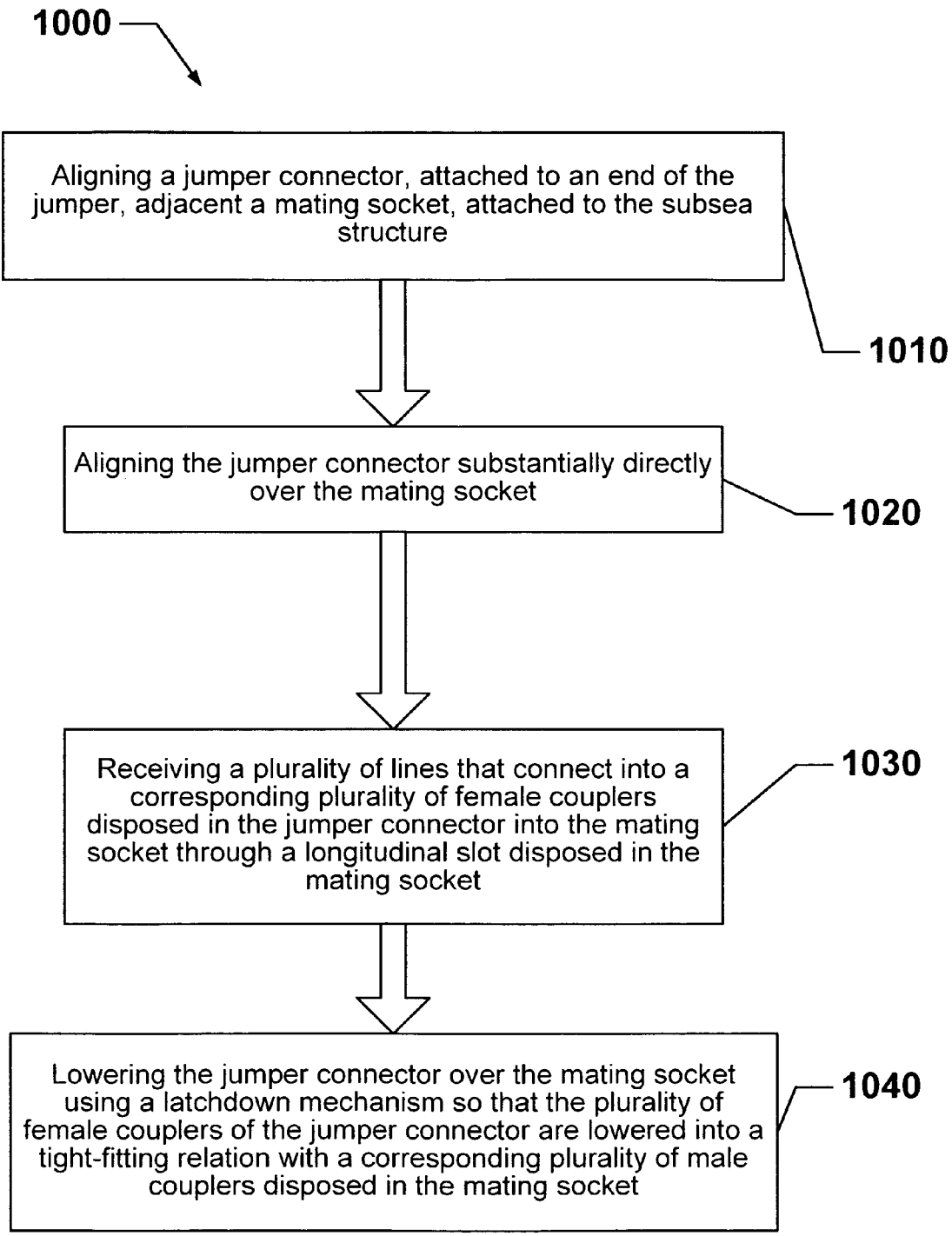
FIG. 10 schematically illustrates a method according to various exemplary embodiments of the present invention for connecting a subsea jumper to a subsea structure.

In various illustrative embodiments, as shown in FIG. 10, a method 1000 for connecting a jumper to a subsea structure may be provided. The method 1000 may comprise aligning a jumper connector, attached to an end of the jumper, adjacent a mating socket, attached to the subsea structure, as indicated at 1010. For example, as described above, the jumper connector 112, attached to an end of the jumper 116, may be aligned adjacent the mating socket 114, attached to the subsea structure 115. Similarly, as described above, the jumper connector 712, attached to an end of the jumper 116, may be aligned adjacent the mating socket 814, attached to the subsea structure 115.

The method 1000 may also comprise aligning the jumper connector substantially directly over the mating socket, as indicated at 1020, and receiving a plurality of lines that connect into a corresponding plurality of female couplers disposed in the jumper connector into the mating socket through a longitudinal slot disposed in the mating socket, as indicated at 1030. For example, as described above, the jumper connector 112 may be aligned substantially directly over the mating socket 114, and the plurality of lines that connect into the corresponding plurality of female couplers 132 disposed in the jumper connector 112 may be received into the mating socket 114 through the longitudinal slot 548 disposed in the mating socket 114. Similarly, as described above, the jumper connector 712 may be aligned substantially directly over the mating socket 814, and the plurality of lines that connect into the corresponding plurality of female couplers 732 disposed in the jumper connector 712 may be received into the mating socket 814 through a longitudinal slot that may be disposed in the mating socket 814 in a way that may be similar to way the longitudinal slot 548 is disposed in the mating socket 114.

The method 1000 may also comprise lowering the jumper connector over the mating socket using a latchdown mechanism so that the plurality of female couplers of the jumper connector are lowered into a tight-fitting relation with a corresponding plurality of male couplers disposed in the mating socket, as indicated at 1040. For example, as described above, the jumper connector 112 may be lowered over the mating socket 114 using the latchdown mechanism 138 so that the plurality of female couplers 132 of the jumper connector 112 are lowered into a tight-fitting relation with the corresponding plurality of male couplers 152 disposed in the mating socket 114. Similarly, as described above, the jumper connector 712 may be lowered over the mating socket 814 using the latchdown mechanism 738 so that the plurality of female couplers 732 of the jumper connector 712 are lowered into a tight-fitting relation with the corresponding plurality of male couplers 852 disposed in the mating socket 814.

Therefore, the various illustrative embodiments of the present invention enabled and described herein are well adapted to carry out the objects and attain the ends and advantages mentioned, as well as those that are inherent therein. While the present invention has been depicted, described, and defined by reference to exemplary embodiments of the present invention, such a reference does not imply any limitation of the present invention, and no such limitation is to be inferred. The present invention is capable of considerable modification, alteration, and equivalency in form and function as will occur to those of ordinary skill in the pertinent arts having the benefit of this disclosure. The depicted and described illustrative embodiments of the present invention are exemplary only and are not exhaustive of the scope of the present invention. Consequently, the present invention is intended to be limited only by the spirit and scope of the appended claims, giving full cognizance to equivalents in all respects.

The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, in the sense of Georg Cantor. Accordingly, the protection sought herein is as set forth in the claims below.

What is claimed is:

1. An assembly for connecting a jumper to a subsea structure, the assembly comprising: a connector defined by a vertically disposed main body having a bottom plate with an opening therethrough and a first plurality of vertically disposed couplers connected to the bottom plate; a jumper received through the opening in the bottom plate of the connector, said jumper being defined by a plurality of lines that connect to the first plurality of vertically disposed couplers; and a mating socket attached to the subsea structure having a substantially c-shaped main housing, a base plate connected thereto and a corresponding second plurality of couplers, which are oriented vertically and disposed in a horizontal plane at a bottom surface of the substantially c-shaped main housing of the mating socket; wherein the jumper is moved laterally into the mating socket and then lowered to make the connection between the jumper and the mating socket.

2. The assembly for connecting the jumper to the subsea structure of claim 1, wherein the vertically disposed main body is substantially cylindrically-shaped.

3. The assembly for connecting the jumper to the subsea structure of claim 1, wherein the vertically disposed main body connects to the bottom plate in the horizontal plane at the bottom surface of the vertically disposed main body, the bottom plate having an opening adapted to accommodate the plurality of lines and being substantially horizontally disposed.

4. The assembly for connecting the jumper to the subsea structure of claim 1, the jumper connector further comprising: a main body extension adapted to attach to a top surface of the vertically disposed main body; and a remotely operated vehicle (ROV) bucket adapted to attach to a top surface of the main body extension.

5. The assembly for connecting the jumper to the subsea structure of claim 4, wherein the main body extension comprises a metal cylinder mounted on the top surface of the vertically disposed main body and the remotely operated vehicle (ROV) bucket comprises a metal cylinder mounted on the top surface of the main body extension, the remotely operated vehicle (ROV) bucket adapted to receive a rotating arm of a remotely operated vehicle (ROV).

6. The assembly for connecting the jumper to the subsea structure of claim 1, the jumper connector further comprising: a latchdown mechanism adapted to force the first plurality of couplers into engagement with the corresponding second plurality of couplers.

7. The assembly for connecting the jumper to the subsea structure of claim 6, the jumper connector further comprising: a main body extension adapted to attach to a top surface of the vertically disposed main body; and a remotely operated vehicle (ROV) bucket adapted to attach to a top surface of the main body extension, the latchdown mechanism further comprising: a torque screw; and a nut, wherein the torque screw mates with the nut and is adapted freely and rotatably to couple to the top surface of the main body extension.

8. The assembly for connecting the jumper to the subsea structure of claim 7, the nut further comprising: a plurality of substantially horizontal extension pins substantially equally spaced apart and adapted to rotate within corresponding slots disposed in the main body extension and to interlock into corresponding J-slots disposed in the mating socket.

9. The assembly for connecting the jumper to the subsea structure of claim 1, wherein the mating socket has a funnel portion having a funnel contour in an upper section and is substantially vertically disposed, having a plurality of J-slots disposed in the funnel portion substantially equally spaced apart.

10. The assembly for connecting the jumper to the subsea structure of claim 1, wherein the base plate of the mating socket is adapted to join the substantially c-shaped main housing to the subsea structure.

11. The assembly for connecting the jumper to the subsea structure of claim 6, the jumper connector further comprising: a main body extension adapted to attach to a top surface of the vertically disposed main body, the latchdown mechanism further comprising: a latch cap disposed substantially co-axially over the main body extension; and a plurality of latching arms attached at one end to the latch cap.

12. The assembly for connecting the jumper to the subsea structure of claim 11, wherein the plurality of latching arms are attached at one end to the latch cap by connecting rods, a thrust collar, and shear pins.

13. The assembly for connecting the jumper to the subsea structure of claim 11, wherein the plurality of latching arms are attached at about a mid-section of the plurality of latching arms to a corresponding plurality of brackets, the plurality of latching arms adapted to pivot about the corresponding plurality of brackets.

14. The assembly for connecting the jumper to the subsea structure of claim 11, wherein the plurality of latching arms are attached at about a mid-section of the plurality of latching arms to a corresponding plurality of brackets, the corresponding plurality of brackets secured to the top surface of the vertically disposed main body.

15. The assembly for connecting the jumper to the subsea structure of claim 6, the jumper connector further comprising: a main body extension adapted to attach to a top surface of the vertically disposed main body, the latchdown mechanism further comprising: a latch cap disposed substantially co-axially over the main body extension; and a plurality of latching arms attached at one end to the latch cap by connecting rods, a thrust collar, and shear pins, the plurality of latching arms attached at about a mid-section of the plurality of latching arms to a corresponding plurality of brackets, the plurality of latching arms adapted to pivot about the corresponding plurality of brackets, the corresponding plurality of brackets secured to the top surface of the vertically disposed main body.

16. The assembly for connecting the jumper to the subsea structure of claim 11, wherein the mating socket has a groove and a corresponding locking shoulder, the groove and the corresponding locking shoulder adapted to engage with the plurality of latching arms to force the first plurality of couplers into engagement with the second plurality of couplers and to lock the jumper connector within the mating socket.

17. The assembly for connecting the jumper to the subsea structure of claim 12, wherein the mating socket has a groove and a corresponding locking shoulder, the groove and the corresponding locking shoulder adapted to engage with the plurality of latching arms to force the first plurality of couplers into engagement with the second plurality of couplers and to lock the jumper connector within the mating socket.

18. The assembly for connecting the jumper to the subsea structure of claim 13, wherein the mating socket has a groove and a corresponding locking shoulder, the groove and the corresponding locking shoulder adapted to engage with the plurality of latching arms to force the first plurality of couplers into engagement with the second plurality of couplers and to lock the jumper connector within the mating socket.

19. The assembly for connecting the jumper to the subsea structure of claim 14, wherein the mating socket has a groove and a corresponding locking shoulder, the groove and the corresponding locking shoulder adapted to engage with the plurality of latching arms to force the first plurality of couplers into engagement with the second plurality of couplers and to lock the jumper connector within the mating socket.

20. The assembly for connecting the jumper to the subsea structure of claim 15, wherein the mating socket has a groove and a corresponding locking shoulder, the groove and the corresponding locking shoulder adapted to engage with the plurality of latching arms to force the first plurality of couplers into engagement with the second plurality of couplers and to lock the jumper connector within the mating socket.

21. A method for connecting a jumper to a subsea structure, the method comprising: aligning a jumper connector, attached to an end of the jumper, adjacent a generally c-shaped mating socket, attached to the subsea structure; aligning the jumper connector substantially directly over the mating socket; receiving a plurality of lines that connect into a corresponding first plurality of couplers disposed in the jumper connector into the mating socket laterally through a longitudinal slot disposed in the mating socket; and lowering the jumper connector over the mating socket using a latchdown mechanism so that the first plurality of couplers of the jumper connector are lowered into a tight-fitting relation with a corresponding second plurality of male couplers disposed in the mating socket.

22. The method for connecting the jumper to the subsea structure of claim 21, wherein the jumper connector has a vertically disposed main body adapted for receiving the plurality of lines that connect into the corresponding first plurality of couplers, which are oriented vertically and disposed in a horizontal plane at a bottom surface of the vertically disposed main body.

23. The method for connecting the jumper to the subsea structure of claim 21, wherein the mating socket has a substantially c-shaped main housing, a base plate connected thereto and the corresponding second plurality of couplers, which are oriented vertically and disposed in a horizontal plane at a bottom surface of the substantially c-shaped main housing of the mating socket.

24. The method for connecting the jumper to the subsea structure of claim 21, wherein the jumper connector has a vertically disposed main body adapted for receiving the plurality of lines that connect into the corresponding first plurality of couplers, which are oriented vertically and disposed in a horizontal plane at a bottom surface of the vertically disposed main body, and the mating socket has a substantially c-shaped main housing, a base plate connected thereto and the corresponding second plurality of couplers, which are oriented vertically and disposed in a horizontal plane at a bottom surface of the substantially c-shaped main housing of the mating socket.

25. The method for connecting the jumper to the subsea structure of claim 21, wherein aligning the jumper connector substantially directly over the mating socket comprises aligning the jumper connector substantially directly over the mating socket so that extension pins disposed in the jumper connector align with openings in J-slots disposed in the mating socket.

26. The method for connecting the jumper to the subsea structure of claim 25, wherein lowering the jumper connector over the mating socket using the latchdown mechanism comprises: fitting the extension pins into the openings in the J-slots; rotating a vertically disposed main body of the jumper connector so that the extension pins move into lateral ends of the J-slots; and continuing to rotate a torque screw disposed in the jumper connector, the torque screw received by a nut disposed in the jumper connector, to lower the torque screw into engagement with a top wall of the vertically disposed main body of the jumper connector so that the first plurality of couplers of the jumper connector are lowered into the tight-fitting relation with the corresponding second plurality of couplers of the mating socket.

27. The method for connecting the jumper to the subsea structure of claim 21, wherein lowering the jumper connector over the mating socket using the latchdown mechanism comprises: engaging a plurality of locking arms disposed on the jumper connector with a groove and a corresponding locking shoulder disposed in the mating socket; and continuing to lower the jumper connector over the mating socket so that the first plurality of couplers of the jumper connector are lowered into the tight-fitting relation with the corresponding second plurality of couplers of the mating socket.

28. The method for connecting the jumper to the subsea structure of claim 27, wherein engaging the plurality of locking arms disposed on the jumper connector with the groove and the corresponding locking shoulder disposed in the mating socket comprises forcing the first plurality of couplers disposed in the jumper connector into engagement with the corresponding second plurality of couplers disposed in the mating socket.

29. The method for connecting the jumper to the subsea structure of claim 27, wherein engaging the plurality of locking arms disposed on the jumper connector with the groove and the corresponding locking shoulder disposed in the mating socket comprises locking the jumper connector within the mating socket.

30. The method for connecting the jumper to the subsea structure of claim 27, wherein engaging the plurality of locking arms disposed on the jumper connector with the groove and the corresponding locking shoulder disposed in the mating socket comprises forcing the first plurality of couplers disposed in the jumper connector into engagement with the corresponding second plurality of couplers disposed in the mating socket and locking the jumper connector within the mating socket.

\* \* \* \* \*